US006952792B2

(12) United States Patent
Emberty et al.

(10) Patent No.: US 6,952,792 B2
(45) Date of Patent: Oct. 4, 2005

(54) FAILOVER SYSTEM FOR STORAGE AREA NETWORK

(75) Inventors: Robert George Emberty, Tucson, AZ (US); Craig Anthony Klein, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 594 days.

(21) Appl. No.: 10/100,800

(22) Filed: Mar. 19, 2002

(65) Prior Publication Data

US 2003/0182593 A1 Sep. 25, 2003

(51) Int. Cl.[7] .............................................. G06F 11/00
(52) U.S. Cl. ........................ 714/5; 714/4; 714/6; 714/7
(58) Field of Search ................................ 714/4, 5, 6, 7

(56) References Cited

U.S. PATENT DOCUMENTS

| | | | |
|---|---|---|---|
| 5,455,926 A | 10/1995 | Keele et al. | |
| 5,642,497 A | 6/1997 | Crary et al. | |
| 5,829,046 A | 10/1998 | Tzelnic et al. | |
| 5,928,367 A | 7/1999 | Nelson et al. | |
| 6,070,224 A | 5/2000 | LeCrone et al. | |
| 6,128,698 A | 10/2000 | Georgis | |
| 6,769,071 B1 * | 7/2004 | Cheng et al. | 714/4 |
| 6,775,790 B2 * | 8/2004 | Reuter et al. | 714/5 |

* cited by examiner

*Primary Examiner*—Nadeem Iqbal
*Assistant Examiner*—Timothy M. Bonura
(74) *Attorney, Agent, or Firm*—Scully, Scott, Murphy & Presser; Jean M. Barkley (57) ABSTRACT

A computing system implements a SAN attached automated Hierarchical Storage Library with diverse media types and media failover capability where storage communications destined for any one media type may be redirected to another media type for uninterrupted storage communications with a host system when a failover condition has occurred. A preferred embodiment comprises: a) a controller network interface for connecting the storage area to a network; b) at least one control unit for HDD and removable media emulation; c) a failover bridge for seamless protocol conversion between media types; d) an HDD interface for connection to a plurality of HDD's on at least one backplane; e) at least one dual redundant controller component with dual mirrored NVRAM's thereby providing dual primary and failover communications links for the plurality of HDD's and removable media drives; f) a removable media interface for a plurality of removable media or removable media emulators.

22 Claims, 5 Drawing Sheets

FAILOVER SYSTEM FOR STORAGE AREA NETWORK

FIELD OF THE INVENTION

This invention relates generally to diverse storage media systems, and particularly, to Hard Disk Drive (HDD) and removable media storage systems. More particularly, the invention is directed to a novel system for seamlessly switching data destined for HDD storage to a failover storage system depending upon the operational status and/or utilization of resources within the library. Additionally, the invention includes redundant controller component failover which is activated depending on controller component operational status, to provide uninterrupted data communication to attached storage devices.

BACKGROUND OF THE INVENTION

A Storage Area Network (SAN) is a specialized network which enables access among servers and storage resources available on the network. Thus SAN's enable a number of servers and their applications to transfer and move large amounts of data. A major advantage of the SAN configuration is that communication via the SAN is specific to data storage operations, i.e. the data storage related traffic is not shared with other general purpose traffic. The resultant independence of storage related traffic in the SAN provides a more efficient means of carrying out required storage operations. A typical SAN configuration, however, provides only one controller per media storage type. For example, an HDD media has its controller while tape or other removable media unit has a different controller with no data communications linking the two controllers. The lack of linkage between the two controllers results in storage/retrieval bottlenecks when either controller or media system is unavailable to service a request from any of the hosts. A solution to this problem would make a SAN more robust and increase the desirability of using a SAN, especially for Hierarchical Storage Library systems and the like.

The prior art does not address the problem of concurrent storage and retrieval of diverse media. Existing systems, such as disclosed in Keele, (U.S. Pat. No. 5,455,926), provide tape emulation where the media is actually a HDD or optical storage unit, however no mechanism is provided for alternative operation as a primary or secondary failover storage media in a SAN as required in the instance of a controller/media failure or busy status indication.

Yet another reference, Tzelnic et al (U.S. Pat. No. 5,829,046), discloses dual redundant controller servers for robotic commands to a tape library. This reference, however does not solve the additional problem of protocol conversion for concurrently maintaining storage access in both HDD and tape or other storage systems with diverse media.

It would thus be highly desirable to provide a robust storage media and control system wherein data storage communication with a host system continues seamlessly despite controller/media failure or busy status.

SUMMARY OF THE INVENTION

It is an object of the present invention to seamlessly provide a means by which a storage system can continue data storage operations when its storage media controller indicates failure or busy status in that controller.

Another object of the present invention is to seamlessly provide a failover storage means when a primary storage means is unavailable, irrespective of media type, i.e. primary and failover media types may be the same or diverse, e.g., HDD, tape, CD-R, etc.

According to the principles of the invention, there is provided for a computing system implementing a Storage Area Network, a system for storing data comprising: a) a controller network interface for connecting the storage area to a network; b) a control unit for HDD and removable media emulation; c) a failover bridge for seamless emulation conversion from removable media to disk and from disk to removable media; d) an HDD interface for connection to a plurality of HDD's on a backplane through primary storage communications links; e) a redundant controller component for control of the plurality of HDD's through redundant failover storage communications links; f) a removable media drive interface for a plurality of removable media drives; and, g) a redundant controller component for control of the plurality of removable media drives through redundant failover storage communications links.

Advantageously, the media storage and controller component failover of this invention is ideally suited for a SAN and more particularly for a SAN-attached Hierarchical Storage Library on any computing system with the appropriate network connection such as fibre-channel arbitrated loop.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENTS

Figure 1:
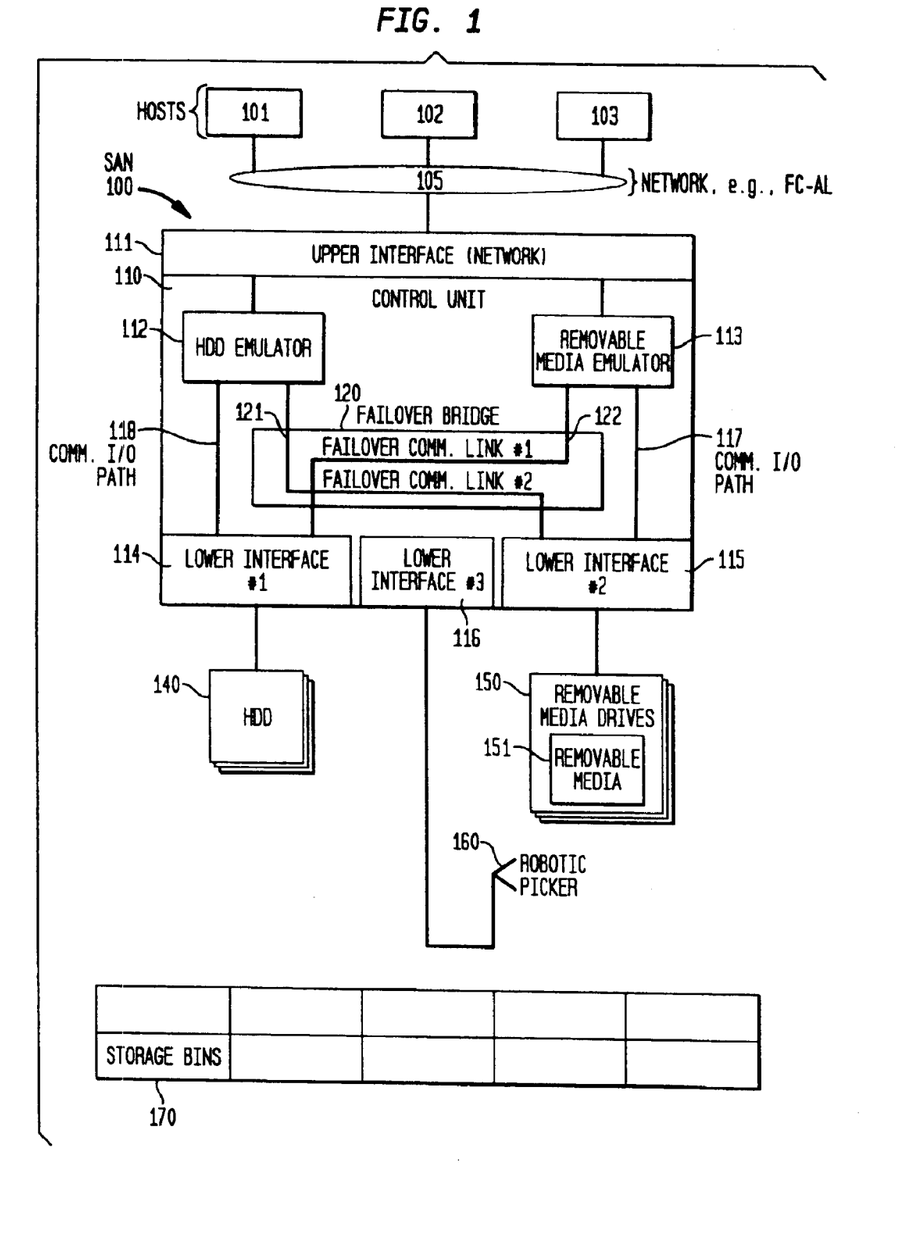
FIG. 1 is a block diagram depicting the Storage Area Network (SAN) including interfaces, control unit, storage emulators, and failover bridge.

In accordance with the present invention, as shown in FIG. 1, a control unit 110 is a part of Storage Area Network 100. The SAN is in communication with at least one host which may be, as shown in FIG. 1, one of a plurality of host computer systems 101, 102, 103 via a network connection 105 which for exemplary purposes, is a fiber channel arbitrated loop. The network connection is connected to control unit 110 via a suitable controller network interface 111. It should be noted that other network connection means are possible including SCSI, Ethernet, Gigabit Ethernet, TCP/IP, ESCON (Enterprise System Connectivity), FICON (Fibre Channel Connectivity), IEEE-1394 Fire Wire, for example. However, for maximum scalability the Fibre channel is preferred in this embodiment. The network interface 111 may handle any number of protocols depending on the connection 105 used.

As shown in FIG. 1, the control unit 110 receives commands from the network connection and through interface 111, forwards the commands to either the HDD emulator 112 or the removable media emulator 113 and their corresponding storage and retrieval data communications I/O paths. During nominal operations without bottlenecking or failures at the lower interface level 114 or 115, HDD emulator 112 sends commands directly to the HDD interface, lower interface #1 114 via a HDD primary storage and retrieval data communications I/O path 118 through which communications with any of the hosts is maintained. The removable media emulator 113 provides removable media storage and retrieval functionality and sends commands via communications I/O path 117 directly to the lower interface #2 115 which may be either a removable media drive interface or an HDD interface operating in tape drive interface emulation mode. Host communication with the removable media storage device 150, 151 is maintained with a removable media primary storage and retrieval data communications I/O path 117. While the embodiment shown shows two primary storage and retrieval data communications I/O paths 117, 118 communicating with the respective HDD storage area and removable media storage area, it is within the scope of this invention to connect multiple primary storage and retrieval data communications I/O paths to multiple storage areas.

In operation, when interface 114 is not working properly, or is unavailable, or when all HDD's 140 attached to lower interface #1 114 are busy, the HDD emulator 112 will redirect all communications intended for the unavailable HDD lower interface #1 114 to a failover bridge 120. Thus, the HDD primary storage and retrieval data communications I/O path is seamlessly redirected to a failover storage and retrieval data communications I/O path in the failover bridge. A protocol conversion from HDD emulation to removable media emulation is executed within the failover bridge 120 through failover path 121 and communication originally intended for the HDD is redirected to lower interface #2 115, providing failover storage and retrieval communication to the removable media drives 150, or HDD tape drive emulators.

Conversely, when interface #2 115 is not working properly or all removable media 151 and removable media drives 150 are busy, i.e., presenting a status of unavailable to control unit 110, the removable media emulator 113 will redirect all communications intended for the unavailable removable media drive interface #2 115 or removable media drive interface emulator 113 to the failover bridge 120. A protocol conversion from removable media emulation to HDD emulation is executed within the failover bridge through failover path 122 and communication originally intended for the removable media is redirected to lower interface #1 114, providing failover storage and retrieval communication to the HDD's 140.

Removable media 151 are preferably tape cartridges, such as IBM's 3495 tape cartridge. Removable media drives 150 are preferably tape drives such as IBM's 3495 tape drive. Other removable media and removable media drive combinations are possible, such as Digital Versatile Disk (DVD) optical media and DVD optical drives, Magneto-Optical (MO) media and MO drives, Compact Disk Recordable (CD-R) media and CD-R drives, Compact Disk Multi-Recordable (CD-RW) media and CD-RW drives, and Phase-Change (PC) optical media and PC optical drives. Correspondingly, removable media emulation 113 is configured to support whichever removeable media 151 is used. Although tape is typically in a protective cartridge, the DVD, MO, CD-R(W), and PC optical media may also optionally be in a protective cartridge.

Yet another example of a storage device is solid state memory which interfaces directly with either lower interface #1 114 or lower interface #2 115.

Although FIG. 1 shows the preferred embodiment of HDD's 140 removably coupled to lower interface #1 114 and removable media drives 150 coupled to lower interface #2 115, other embodiments are possible. For example, HDD's 140 could be removably coupled to both lower interface #1 114 and lower interface #2 115. Additionally, removable media drives 150 could be coupled to both lower interface #1 114 and lower interface #2 115.

Figure 2:
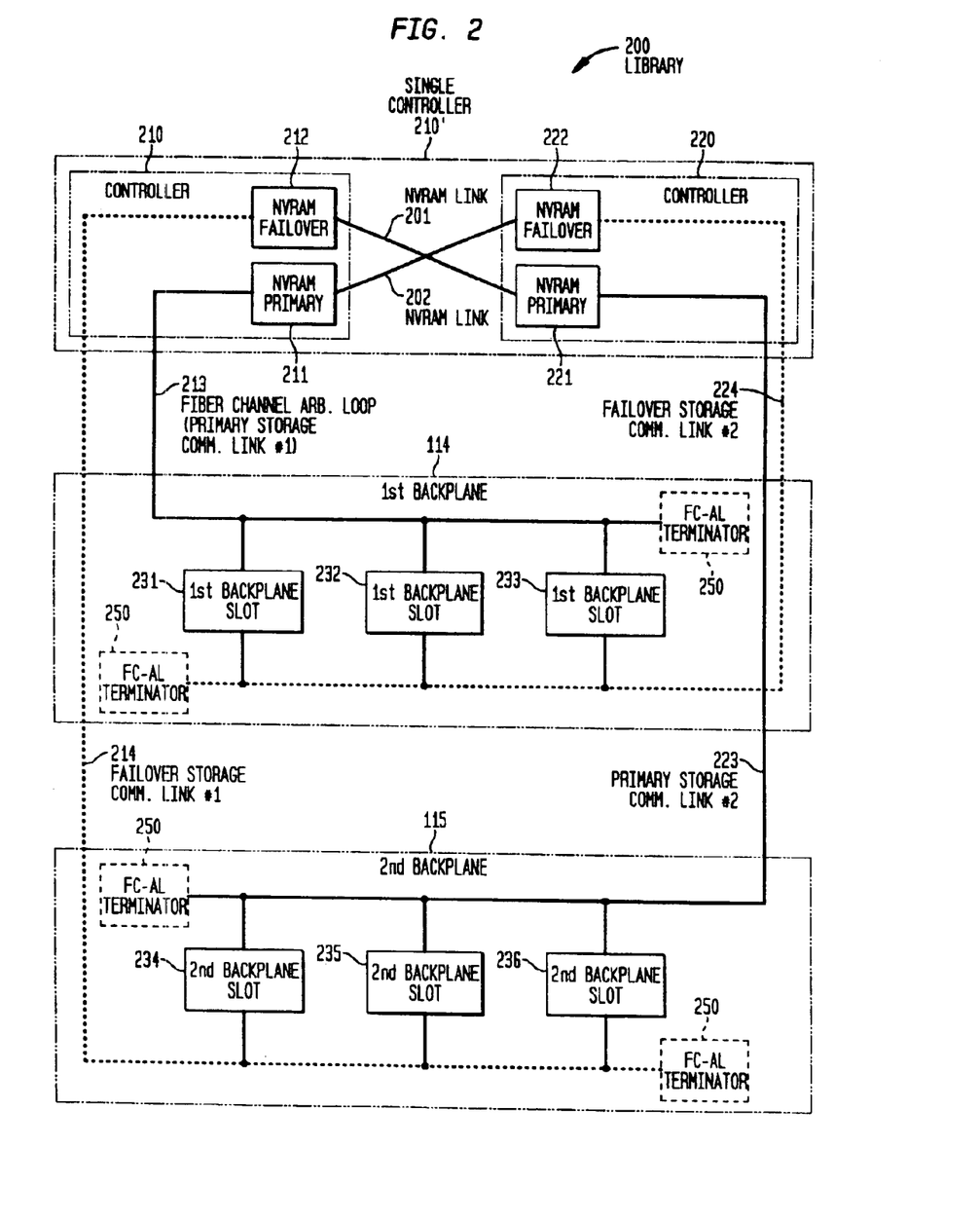
FIG. 2 is a block diagram depicting an embodiment of the HDD interface featuring failover control of an HDD library with backplanes.

When interfaces 114 and 115 are utilized as backplanes for HDD's, an additional level of fault tolerant, dual redundant failover may be achieved. As shown in FIG. 2, the library system in another embodiment, includes HDD backplane slots 231 through 233 provisioned in backplane 114 and slots 234 through 236 provisioned in backplane 115. Each HDD 140 within the library 200 may be docked with one of a plurality of HDD backplane slots 231 through 236. In this embodiment backplane 114 may also include data storage controller 210 with primary Non Volatile RAM (NVRAM) 211 and secondary NVRAM 212. The backplane further includes a separate data storage controller 220 with primary NVRAM 221 and secondary NVRAM 222. The primary NVRAM 211 in data storage controller 210 communicates with backplane slots 231, 232 and 233 via primary I/O channel 213. In this configuration, the I/O channel 213 is a first primary storage communications link. Additionally, all activity undertaken by primary NVRAM 211 in control unit 210 is mirrored to secondary, i.e., failover NVRAM 222 in data storage controller 220 via NVRAM link 202. The mirrored activity includes but is not limited to data transferred, directory updates, command and control signals to the HDD's, identity and logical addresses of the HDD's. Any type of signal necessary to allow data storage controller 220 to takeover data storage/retrieval operations for data storage controller 210 is mirrored to NVRAM 222. Thus if controller 210 returns a status of unavailable, then controller 220 can service the work load of controller 210 via secondary, i.e., failover NVRAM 222 and redundant failover storage communications link 224, in a seamless and transparent manner to the user. Additionally, if power is lost to either backplane 114 or 115, the remaining powered up backplane is available to both control units 210 and 220 thereby providing electrical systems failover capability as well.

Additionally, as shown in FIG. 2, the primary NVRAM 221 in control unit 220 communicates with backplane 115 via primary I/O channel, i.e., second primary storage communications link 223. All activity undertaken by primary NVRAM 221 is similarly mirrored to secondary, i.e., failover NVRAM 212 in control unit 210 via NVRAM link 201. Thus, if control unit 220 returns a status of unavailable then control unit 210 can service the workload of control unit 220 via secondary, i.e., failover NVRAM 212 and redundant failover storage communications link 214. In an alternative embodiment, the dual pair of NVRAM and their failover links may be implemented in a single controller, 210'. Additional physical and electrical isolation may be designed into the construction and placement of the dual controllers, 210 and 220, as well as the dual pair NVRAM 211, 212, 221, 222, to provide additional robustness and fault tolerance of the system.

Communications links 213, 214, 223, and 224 are preferably fibre-channel arbitrated loop (FC-AL). However, other communications links are possible, including, but not limited to, SCSI, IEEE 1394 Fire Wire, TCP/IP, Ethernet, Gigabit Ethernet, etc.

Slots 231–236 are self-healing, so that the FC-AL loops, i.e., communications links 213, 214, 223, and 224 are not left open when an HDD is removed from any of the receptacles. Thus, the removal of any HDD will not disturb the electrical connection of remaining HDD's. If communications links 213, 214, 223 and 224 are SCSI, then optional terminators 250 may be desirable.

Referring again to FIG. 1, a lower interface #3 116 provides commands from control unit 110 to robotic picker 160 which functions to move any removable hard disk drives 140 between backplanes 114, 115 and storage bins 170. The interface 116 command signals to robotic picker 160 may be via SCSI, FC-AL, IEEE 1394 Fire Wire, TCP/IP, Ethernet, Gigabit Ethernet, RS232, RS-422, etc. Additionally, robotic picker 160 moves removable media 151 between removable media drives 150 and storage bins 170. The robotic picker thus provides automation for the storage library.

Figure 4:
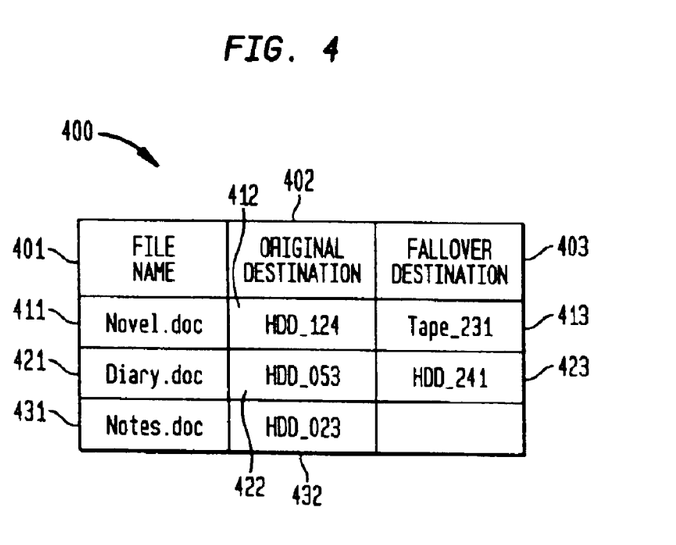
FIG. 4 illustrates a directory for storing both the original destination and the failover destination of data.

FIG. 4 illustrates a directory structure 400, provided in primary NVRAM 211 and failover NVRAM 222 of FIG. 2, or HDD emulator 112 of FIG. 1, which functions to maintain information such as the file name 401, original destination 402, and the failover destination 403 of data files to be stored on HDD's 140 or removable media 151. A similar directory to directory 400 is stored in primary NVRAM 221 and failover NVRAM 212 of FIG. 2 and removable media emulator 113 of FIG. 1. The example directory contents shown in FIG. 4 depict that a file, Novel.doc 411 was originally intended for HDD__124, 412 but was failed over to tape__231, 413. Similarly, directory 400 indicates, for example, that the file Diary.doc 421 was originally intended for HDD__053, 422, but was failed over to HDD__241, 423. Finally, Notes.doc 431 was stored at its original destination HDD__023, 432.

Figure 5:
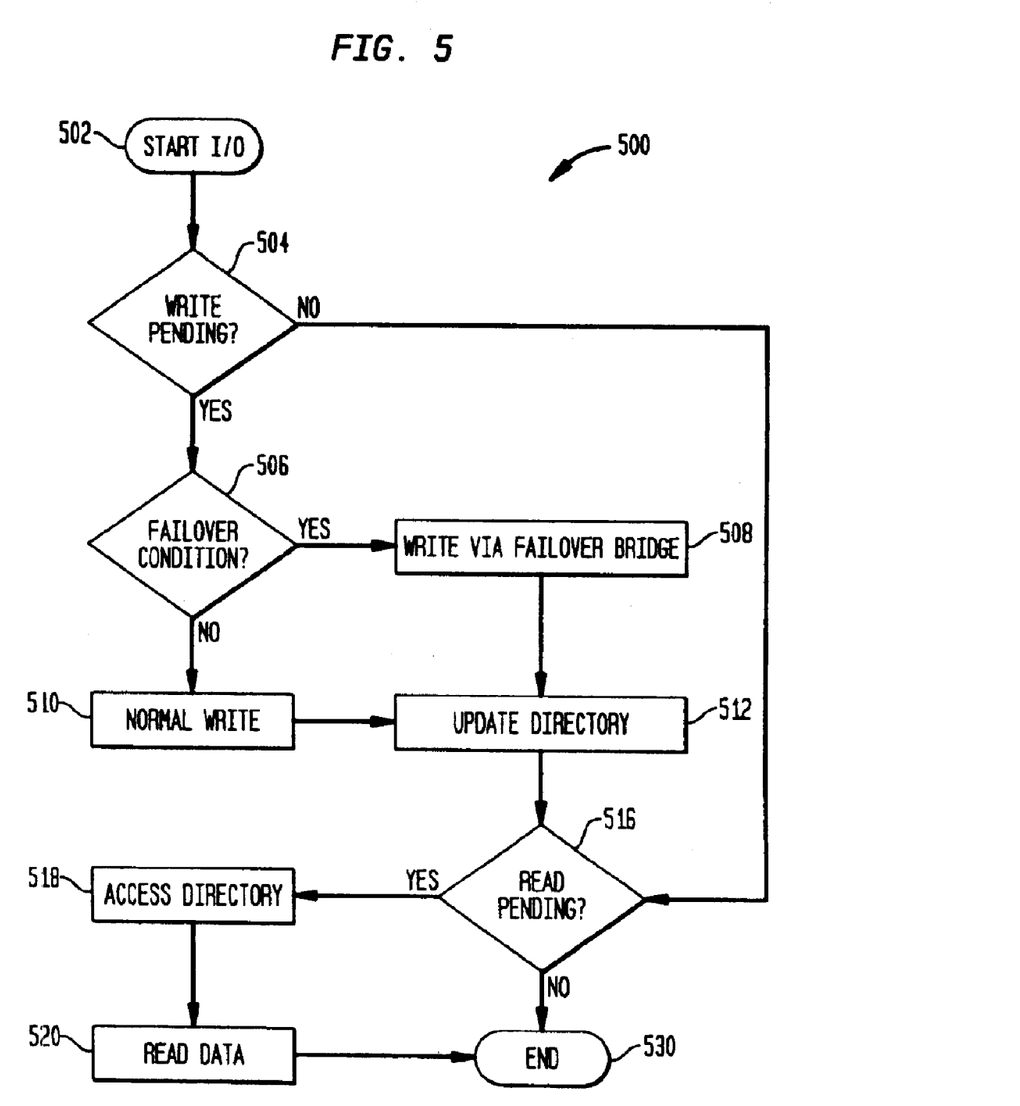
FIG. 5 illustrates directing I/O activity depending on the failover condition; and, FIG. 6 illustrates migrating data from a failover destination to the original destination, once the cause for the failover is resolved.

FIG. 5 shows I/O process 500 for governing failover control logic, according to another aspect of the present invention. Process 500 begins with a start I/O 502 from one of a plurality of hosts 101,102, or 103. The process then flows from step 502 to step 504, where a query is made as to whether the pending I/O operation is a write. If in step 504, the I/O is a write operation, then the process flows to step 506 to see if a failover condition is present. A failover condition may be created by one or more of the following: (a) excessive workload causing the primary communications links to be busy; (b) inoperable communications links; (c) a damaged removable media 151 or a damaged HDD 140; (d) picker 160 is too busy to mount any HDD's 140 or removable media 151; or, (e) all of slots 231–236 are already occupied and robotic picker 160 cannot mount the HDD 140 or removable media 151 originally intended for use by hosts 101, 102, 103.

If a failover condition is not present in step 506, the process flows to step 510 and the data is written via the primary communications links to the originally intended destination. This would include of robotic picker 160 mounting HDD 140 or removable media 151 if they are still in storage slots 170. However, if a failover condition does exist in step 506, then the process flows to step 508 where the data is written via a failover bridge to a failover destination. Both steps 510 and 508 flow to step 512, where directory 400 is updated. As already discussed, directory 400 includes information regarding the original desired destination of the data file and the failover destination, if one were used.

If in step 504, no write operation is pending, or upon the completion of step 512, in which the directory is updated for write operations, the process flows to step 516, in which the query is made whether any data is to be read. If no data is to be read in step 516, the process ends in step 530 and the host is notified of the termination of the I/O process. However, if in step 516 data is to be read, the process flows to step 518, where the directory 400 is accessed to retrieve the location the data is to be read from. Then, the process flows from step 518 to step 520, in which the data is read from (a) the failover destination if instructed, or, (b) the original destination. At step 520 the robotic picker 160 may mount the HDD 140 or removable media 151 if the required media are still in storage slots 170. Once the data is read in step 520, the process ends at step 530.

Figure 6:
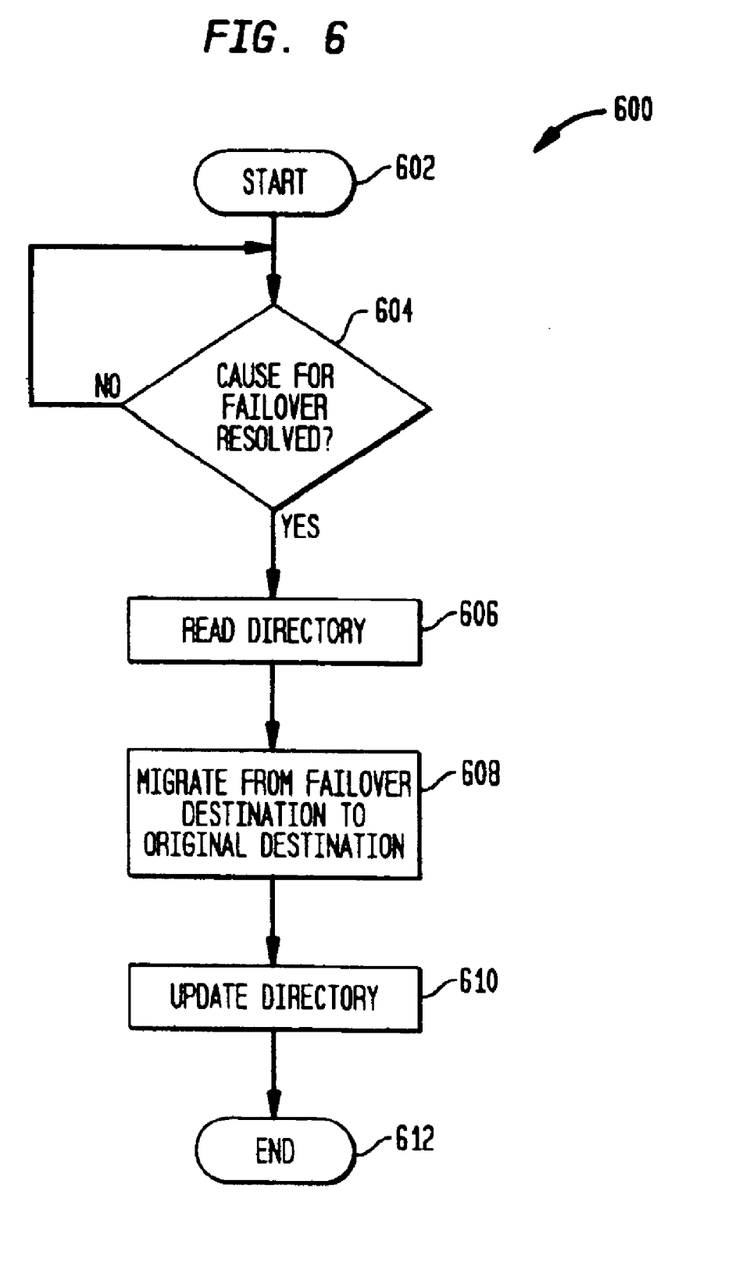

FIG. 6 shows migration process 600 for migrating data from the failover destination back to the original destination once the cause for the failover is resolved. In this manner, the data is eventually stored where the hosts 101, 102, or 103 desired it. The migration process 600 begins at step 602, which is typically not entered until either SAN 100 or library 200 are in a substantially quiescent state and the migration will not severely impact incoming I/O requests. The process flows from start step 602 to decision step 604, in which the query is made whether the cause for the failover condition has been resolved. If the cause for the failover condition has not been resolved, the process repeats the query until such time that the failover condition is resolved. Once the failover condition is resolved in step 604, the process flows to step 606 and directory 400 is read for each emulator 112 and 113 of FIG. 1 and each primary NVRAM 221 and 221 of FIG. 2.

At step 608 data is migrated from its failover destination to the originally intended destination. For the example directory 400 shown in FIG. 4, the file Novel.doc 411 was failed over to Tape__231, 413, and would then be migrated to its originally intended destination of HDD__124, 412. Once this migration is completed in step 608, the failover destination would be deleted from directory 400 in step 610, to indicate that the data is now stored in its originally intended destination. An example of the directory entry of a data file at the completion of a migration is the file Notes.doc 431, which indicates that no failover destination is shown for this file in FIG. 4. At the completion of the update of directory 400 in step 610, the migration process ends at step 612.

In summary of FIGS. 4–6, there are two possible destinations for written data, an original destination and a failover destination. All data written to a failover destination has its directory annotated with both the original destination and, if used, the failover destination. Thus, when the failover condition is resolved, a migration process can be run, preferably in the background, to move the data from being stored in a failover destination to the originally intended destination. The processes shown in FIGS. 5–6 could be stored on a computer usable medium such as illustrated in FIG. 3.

Figure 3:
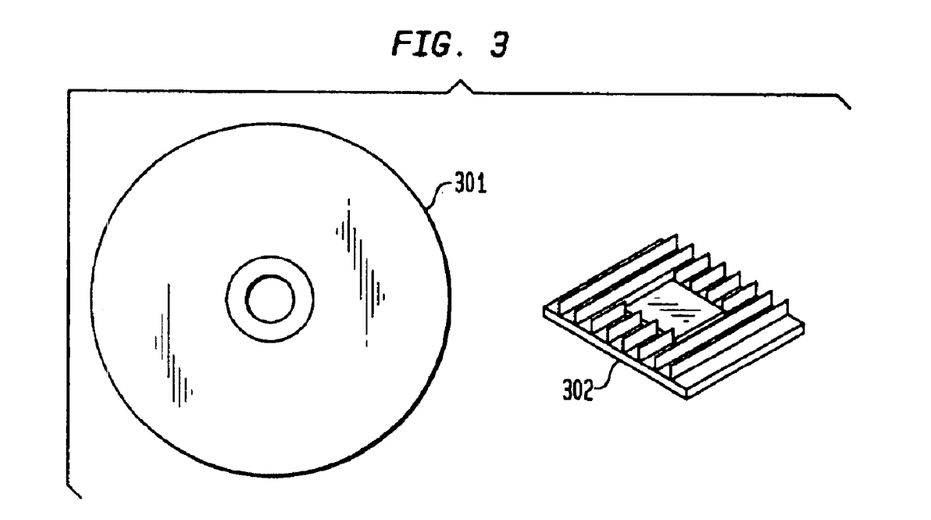
FIG. 3 illustrates possible computer usable media in which an embodiment of this invention may be stored with the appropriate computer readable program code for failover capability within a storage library.

Referring to FIG. 3, it is shown that the functionality of the current invention may be embodied in a computer usable medium with the appropriate computer readable program code. FIG. 3, showing a compact disk (CD) 301 and a computer integrated circuit 302, is intended to be representative of the computer usable medium that can be used by the invention and is not intended to exclude other possible media in which this invention may be embodied.

Thus, the present invention allows continued, i.e. uninterrupted, HDD library access in the event of failed control units, failed communications links, bottlenecked, i.e., busy control units, bottlenecked, i.e., busy communications links. Additionally when all HDD library access is unavailable, such as in the event of simultaneous primary and secondary failures in the HDD interface, HDD emulation may continue through the failover bridge where the emulation is converted so that communication takes place with an alternative interface. Similarly the present invention allows removable media library access to continue in the event of failed or bottlenecked communication links, or bottlenecked control units. When all removable media library access is unavailable such as in the event of an interface failure, the removable media emulation may continue through the failover bridge where the emulation is converted so that communication takes place with the HDD interface.

While the invention has been particularly shown and described with respect to illustrative and preferred embodiments thereof, it will be understood by those skilled in the art that the foregoing and other changes in form and details may be made therein without departing from the spirit and scope of the invention which should be limited only by the scope of the appended claims.

What is claimed is:

1. A storage and retrieval library for enabling a host system access to one or more diverse media storage devices over a network, said storage and retrieval library comprising:
   a) a controller network interface for enabling communication between said host system and said storage and retrieval library;
   b) a control unit for controlling communications of a plurality of primary storage and retrieval data communications I/O paths and a plurality of failover storage and retrieval data communications I/O paths with said host system;
   c) a failover bridge for detecting a failure condition in any of the primary I/O paths, and in response to detecting a failure condition in any one of said primary I/O paths, to redirect automatically communications destined for said any one of said plurality of primary storage and retrieval data communications I/O paths to a corresponding one of said plurality of failover storage and retrieval data communications I/O paths for uninterrupted data storage and retrieval communication with said host system;
   d) wherein said failover bridge activates seamless redirection of communications upon detection of a failover condition.

2. The storage and retrieval library of claim 1, wherein:
   at least one of said plurality of primary storage and retrieval data communications I/O paths provides storage and retrieval functionality for a connected first type of said diverse media storage devices; and,
   said corresponding one of said plurality of failover storage and retrieval data communications I/O paths provides protocol conversion for storage and retrieval functionality for a connected second type of said diverse media storage devices.

3. The storage and retrieval library of claim 2, wherein said connected first type of said diverse media storage devices comprises a HDD and said connected second type of said diverse media storage devices comprises a tape drive.

4. The storage and retrieval library of claim 2, wherein said connected first type of said diverse media storage devices comprises an optical drive and said connected second type of said diverse media storage devices comprises a HDD.

5. The storage and retrieval library of claim 2, wherein said connected first type of said diverse media storage devices comprises a solid state memory, and said connected second type of said diverse media storage devices comprises a HDD.

6. The storage and retrieval library of claim 2, wherein at least one of said first type of said diverse media storage devices and said second type of said diverse media storage devices comprises removable storage media.

7. The storage and retrieval library of claim 1, wherein:
   at least one of said plurality of primary storage and retrieval data communications I/O paths provides removable media storage and retrieval functionality; and,
   said corresponding one of said plurality of failover storage and retrieval data communications I/O paths provides protocol conversion for HDD storage and retrieval functionality; and,
   said corresponding one of said plurality of failover storage and retrieval data communications I/O paths is connected to at least one of said storage devices.

8. A storage and retrieval library for enabling a host system access to one or more diverse media storage devices over a network, said storage and retrieval library comprising:
   a) a controller network interface for enabling communication between said host system and said storage and retrieval library;
   b) a control unit for controlling communications of a plurality of primary storage and retrieval data communications I/O paths and a plurality of failover storage and retrieval data communications I/O paths with said host system;
   c) a failover bridge for seamless redirection of said communications destined for any one of said plurality of primary storage and retrieval data communications I/O paths to a corresponding one of said plurality of failover storage and retrieval data communications I/O paths for uninterrupted data storage and retrieval communication with said host system;
   d) said failover bridge activating said activates seamless redirection of communications upon detection of a failover condition;
   e) at least one data storage controller connected to at least one of said plurality of primary storage and retrieval data communications I/O paths and to at least one of said plurality of failover storage and retrieval data communications I/O paths, said at least one data storage controller comprising at least two pair of NVRAM;
   each of said at least two pair of NVRAM comprises a primary NVRAM and a secondary NVRAM wherein the secondary NVRAM of a second of said at least two pair of NVRAM mirrors the primary NVRAM of a first of said at least two pair of NVRAM and the secondary NVRAM of said first of said at least two pair of NVRAM mirrors the primary NVRAM of said second of said at least two pair of NVRAM;
   said primary NVRAM of said first of said at least two pair of NVRAM providing a first primary storage communications link to at least one of a first plurality of said diverse media storage devices;
   said secondary NVRAM of said second of said at least two pair of NVRAM providing a second failover storage communications link to said at least one of said first plurality of said storage devices when said primary NVRAM of said first of said at least two pair of NVRAM is unable to provide said first primary storage communications link to said at least one of a first plurality of said diverse media storage devices;

said primary NVRAM of said second of said at least two pair of NVRAM providing a second primary storage communications link to at least one of a second plurality of said diverse media storage devices;

said secondary NVRAM of said first of said at least two pair of NVRAM providing a first failover storage communications link to said at least one of said second plurality of said storage devices when said primary NVRAM of said second of said at least two pair of NVRAM is unable to provide said second primary storage communications link to said at least one of said second plurality of said diverse media storage devices.

9. The storage and retrieval library of claim 8, further comprising:

means for providing physical and electrical isolation between said at least two pair of NVRAM thereby providing additional fault tolerance;

said first primary storage communications link including a first primary FC-AL connected to said first plurality of said diverse media storage devices;

said second failover storage communications link including a second redundant failover FC-AL connected to said first plurality of said diverse media storage devices;

said second primary storage communications link including a second primary FC-AL connected to said second plurality of said diverse media storage devices;

said first failover storage communications link including a first redundant failover FC-AL connected to said second plurality of said diverse media storage devices.

10. The storage and retrieval library of claim 9, further comprising said first primary FC-AL connection and said second redundant failover FC-AL connection to said first plurality of said diverse media storage devices being through a first backplane, wherein any of said first plurality of said diverse media storage devices is removable without disturbing the electrical connection of a remaining of said first plurality of said diverse media storage devices.

11. The storage and retrieval library of claim 9, further comprising said second primary FC-AL connection and said first redundant failover FC-AL connection to said first plurality of said diverse media storage devices are through a second backplane wherein any of said second plurality of said diverse media storage devices is removable without disturbing the electrical connection of a remaining of said second plurality of said diverse media storage devices.

12. The storage and retrieval library of claim 9, further comprising:

a) a Hierarchical Storage Library wherein said Hierarchical Storage Library is attached to a Storage Area Network;

b) at least one robotic picker providing the capability of moving said storage devices between said backplanes; and, c) at least one storage bin as requested for maintaining storage and retrieval capability of said Hierarchical Storage Library.

13. A storage and retrieval library system for enabling at least one host access to one or more diverse media storage devices over a network, said storage and retrieval library system comprising:

a) means for enabling communication between said at least one host and said storage and retrieval library system;

b) means for controlling communications of a plurality of primary storage and retrieval data communications I/O paths and a plurality of failover storage and retrieval data communications I/O paths with said at least one host;

c) means for detecting a failure condition in any of the primary I/O paths, and in response to detecting a failure condition in any one of said primary I/O paths, to redirect automatically communications destined for any one of said plurality of primary storage and retrieval data communications I/O paths to a corresponding one of said plurality of failover storage and retrieval data communications I/O paths for uninterrupted data storage and retrieval communication with said at least one host;

d) wherein said means for directing activities seamless redirection of communications upon detection of a failover condition.

14. The storage and retrieval library system of claim 13, wherein:

said seamless redirection means further comprises means for protocol conversion when a data storage device connected to said primary storage and retrieval data communications I/O paths is of a different type from a data storage device connected to said failover storage and retrieval data communications I/O paths.

15. A storage and retrieval library system for enabling at least one host access to one or more diverse media storage devices over a network, said storage and retrieval library system comprising:

a) means for enabling communication between said at least one host and said storage and retrieval library system;

b) means for controlling communications of a plurality of primary storage and retrieval data communications I/O paths and a plurality of failover storage and retrieval data communications I/O paths with said at least one host;

c) means for seamless redirection of said communications destined for any one of said plurality of primary storage and retrieval data communications I/O paths to a corresponding one of said plurality of failover storage and retrieval data communications I/O paths for uninterrupted data storage and retrieval communication with said at least one host;

d) means for activating said seamless redirection upon detection of a failover condition;

e) first primary means for controlling a first plurality of said diverse media storage devices;

f) second primary means for controlling a second plurality of said diverse media storage devices;

g) first redundant failover means for controlling said second plurality of said diverse media storage devices;

h) second redundant failover means for controlling said first plurality of said diverse media storage devices;

said first and said second plurality of diverse media storage devices being connected to at least one of said plurality of primary storage and retrieval data communications I/O paths and to at least one of said plurality of failover storage and retrieval data communications I/O paths.

16. The storage and retrieval library system of claim 15, further comprising:

means for detecting a failover condition of said first primary controlling means;

means for switching storage and retrieval communications control to said second redundant failover controlling means when said failover condition is detected;

means for detecting a failure condition of said second primary controlling means;

means for switching storage and retrieval communications control to said first redundant failover controlling means when a failure condition in said second primary controlling means is detected.

17. A computer program product comprising:

a computer usable medium having computer readable program code embodied therein for enabling a host system access to one or more diverse media storage devices over a network, the computer readable program code in said computer program product comprising:

a) first computer readable program code for causing a computer to enable communication between said host system and said storage and retrieval library;

b) second computer readable program code for causing a computer to control communications of a plurality of primary storage and retrieval data communications I/O paths and a plurality of failover storage and retrieval data communications I/O paths with said host system;

c) third computer readable program code for causing a computer to detect a failure condition in any of the primary I/O paths, and in response to detecting a failure condition in any one of said primary I/O paths, to redirect automatically communications destined for any said one of said plurality of primary storage and retrieval data communications I/O paths to a corresponding one of said plurality of failover storage and retrieval data communications I/O paths for uninterrupted data storage and retrieval communication with said host system;

d) fourth computer readable program code for causing a computer to activate said seamless redirection upon detection of a failover condition.

18. The computer program product of claim 17, further comprising:

said third computer readable program code including code for causing a computer to perform protocol conversion when a data storage device connected to at least one of said plurality of primary storage and retrieval data communications I/O paths is of a different type from a data storage device connected to a corresponding at least one of said failover storage and retrieval data communications I/O paths.

19. A computer program product comprising:

a computer usable medium having computer readable program code embodied therein for enabling a host system access to one or more diverse media storage devices over a network, the computer readable program code in said computer program product comprising:

first computer readable program code for causing a computer to enable communication between said host system and said storage and retrieval library;

second computer readable program code for causing a computer to control communications of a plurality of primary storage and retrieval data communications I/O paths and a plurality of failover storage and retrieval data communications I/O paths with said host system;

third computer readable program code for causing a computer to seamlessly redirect said communications destined for any one of said plurality of primary storage and retrieval data communications I/O paths to a corresponding one of said plurality of failover storage and retrieval data communications I/O paths for uninterrupted data storage and retrieval communication with said host system;

fourth computer readable program code for causing a computer to activate said seamless redirection upon detection of a failover condition;

fifth computer readable program code for causing a computer to provide:

a) a first primary controlling function for controlling a first plurality of said divers media storage devices;

b) a second primary controlling function for controlling a second plurality of said diverse media storage devices;

c) a first redundant failover controlling function for controlling said second plurality of diverse media storage devices;

d) a second redundant failover controlling function for controlling said first plurality of diverse media storage devices; and, e) said first and said second plurality of diverse media storage devices being connected to at least one of said plurality of primary storage and retrieval data communications I/O paths and to at least one of said plurality of failover storage and retrieval data communications I/O paths.

20. The computer program product of claim 19, further comprising sixth computer readable program code for causing a computer to provide:

a) a detecting function for detecting a failover condition of said first primary controlling function;

b) a switching function for switching storage and retrieval communications control to said second redundant failover controlling function when said failover condition of said first primary controlling function is detected;

c) A detecting function for detecting a failover condition of said second primary controlling function;

d) a switching function for switching storage and retrieval communications control to said first redundant failover controlling function when said failover condition of said second primary controlling function is detected.

21. A method for storing data via a failover bridge based on a failover condition, comprising:

receiving a write request;

storing said data in a first location, via one of a plurality of primary I/O data paths, if the failover condition is not present;

storing said data in a second location, via one of a plurality of failover I/O data paths, if the failover condition is present;

retrieving said data from said second location once said failover condition is no longer present, then storing said data in said first location;

monitoring the plurality of primary data paths for detecting a failure condition in any of the primary I/O paths, and in response to detecting a failure condition in any one of said primary I/O paths, to redirect automatically data intended for said one of the primary I/O paths onto a corresponding one of the failover I/O data paths.

22. The method as claimed in claim 21, wherein:

the first location is accessed via a first backplane; and, the second location is accessed via a second backplane.

* * * * *